Patented Aug. 21, 1951

2,565,057

UNITED STATES PATENT OFFICE 2,565,057

POLYMYXIN ANTIBIOTIC

Geoffrey Clough Ainsworth and Clifford George Pope, London, England, assignors to Burroughs Wellcome & Co. (U. S. A.) Incorporated, New York, N. Y., a corporation of New York No Drawing. Application October 10, 1947, Serial No. 779,229. In Great Britain December 21, 1946

1 Claim. (Cl. 167—65)

This invention relates to a new antibiotic and to processes for the production, extraction and purification thereof.

The object of our invention is to provide a new antibiotic of good potency, especially against Gram-negative infecting organisms, and suitable for therapeutic use.

Most antibiotics known hitherto are products of the metabolism of moulds, such as *Penicillium notatum*. Our new antibiotic, however, is the product of the metabolism of a species of bacterium.

The species of bacterium which, in accordance with our invention, we employ for the production of an antibiotic is *Bacillus aerosporus* Greer (described in Journal of Infectious Diseases, volume 42, page 508, 1928) or *Bacillus polymyxa* (Prazmowski) Migula (described in Bergey's Manual of Determinative Bacteriology, fifth edition, 1939, pages 701 to 704). These are probably two names for the same bacillus, but if the strains are indeed different we may use either. The therapeutically active substances derived from either or both of these bacilli are termed polymyxin.

The strain of bacillus employed in accordance with our invention may be defined also with reference to its appearance and bioligical characteristics, as follows:

The organism is a bacillus, having central spores; it is motile and produces acid and gas with glucose, lactose, saccharose, mannite, maltose, xylose, arabinose, salicin, raffinose, laevulose and inuline but not with sorbitol or inosite; is indole and methyl-red negative and gives a positive Voges-Proskauer reaction. It produces acid and clot from litmus milk; the litmus is reduced, whey separates and the clot digests. Nitrates are reduced, gelatin undergoes late saccate liquifaction, coagulated serum is liquified. There are at least two colonial variants, one being of whitish appearance and the other brown or grey. Colonies of two of the variants are smooth in outline and mucoid.

The bacillus in question is widely distributed in nature. Besides being airborne it has been found in water, soil, milk, faeces and decaying vegetables.

According to a feature of our invention we select strains of the bacillus which during metabolism yield good amounts of the desired antibiotic. This may be done by biological assay of cultures derived from separate colonies of the organism obtained by plate culture.

The bacillus grows well on the usual culture media. We have obtained best results with an aqueous medium containing 10% by volume of nutrient broth with the addition of 0.002% manganese sulphate, 3% glucose and 0.6% di-ammonium hydrogen phosphate, having a pH of approximately 7.4. The bacillus being aerobic, culture (as in the case of other aerobic bacilli) may be either in static shallow layers or in deeper vessels with artificial aeration.

To prepare the inoculum, incubation of the selected strain at 37° C. for 18 to 24 hours is a suitable procedure. About 5 millilitres of the inoculum may then be added to 100 millilitres of the above described nutrient medium in a flat flask and the whole incubated at 22–28° C. for 3 to 8 days or for 20–24 hours in cases where artificial aeration is employed. Samples are tested for antibiotic content periodically and the culture batch harvested when the antibiotic content is substantially at a maximum.

Because the antibiotic is absorbed by filter materials, the metabolism fluid should be separated from the bacterial by centrifugation. 0.4% of chloroform may be added as preservative.

The metabolism fluid prepared as above described is then treated as follows (in accordance with our invention) to extract the antibiotic therefrom.

First (according to our preferred method) we make the fluid acid to a pH of approximately 2.0 to 2.5. Hydrochloric or sulphuric acids are preferably employed. Phosphoric acid may also be used as acidifying agent, but nitric acid and other oxidising acids should be avoided.

We then treat this acidified fluid with a suitable activated charcoal, whereby we adsorb much of the colouring matter and other impurities present but not the antibiotic. About 0.5% of charcoal relatively to the weight of the solution is a suitable amount. Whether a charcoal is or is not a suitable one, that is to say whether it will adsorb the colouring matter and impurities but not the antibiotic under acid conditions is a matter of simple test. The activated charcoals sold under the trade names Farnell's No. 14 and Farnell's L. S. are suitable for use in this manner.

The charcoal is then filtered off and discarded.

The filtrate, containing the antibiotic, is then made neutral (pH 6.0 to 8.0) by addition of alkali, such as caustic soda. It is then treated again with a suitable activated charcoal. This time (under neutral conditions) the antibiotic is adsorbed.

The charcoal is filtered off and then the antibiotic is eluted from it by washing with aqueous acetone, of approximately 40% concentration by weight, maintained at a pH of approximately 2.5 with sulphuric acid.

Acetone is then added to the eluate until the concentration of acetone is approximately 75%. This solution is then chilled to about 4° C. for about 16 hours. The solid matter, containing the antibiotic, is removed by filtration. It is then treated with water at about 30° C. The insoluble residue is filtered off and discarded.

The filtrate is brought to pH 7 by adding alkali. Further gelatinous inactive material deposits and is filtered off. The remaining solution is then frozen and dried under vacuum while frozen, yielding the crude sulphate of the desired antibiotic.

Several variations on the preferred extraction method above described are possible:

Thus the charcoal whereon the antibiotic has been adsorbed may be washed with dilute hydrochloric acid (pH 2.0 to 2.5) and/or with plain water before the elution with 40% acetone.

Or instead of treating the metabolism fluid with charcoal under acid conditions the charcoal may be added under neutral conditions. The antibiotic and part of the impurities are then adsorbed together upon the charcoal, which is then eluted with 40% acetone at a pH of approximately 2.5, the eluate being subsequently treated as previously described.

A further alternative in the process first described is to suspend the charcoal having the antibiotic adsorbed thereon in neutral ethanol, then filter off the charcoal and wash it with more ethanol. After this the antibiotic may be eluted from the charcoal with dry methanol containing approximately 3.65 grams of hydrochloric acid gas dissolved in each litre. The charcoal is filtered off and the filtrate is diluted immediately with four volumes of dry ether. The crude hydrochloride of the desired antibiotic then precipitates and is removed by filtration. It may be redissolved in methanol, reprecipitated with ether, filtered off, washed with more ether and dried under vacuum.

A further alternative in the method first above described is to recover the antibiotic from the 40% acetone eluate by adjusting this to pH 7 and then evaporating off the acetone under reduced pressure. The remaining solution of the antibiotic in water is stirred with activated charcoal and filtered. The filtrate is discarded. The antibiotic is eluted from the charcoal by 40% aqueous acetone containing approximately 2% by weight of sulphuric acid. The eluate is neutralised with calcium carbonate, cooled to about 4° C. and the precipitated calcium sulphate filtered off. The filtrate is frozen and dried under vacuum while frozen, yielding the sulphate of the antibiotic.

Or after evaporation of the acetone picric acid may be added to precipitate the antibiotic as its picrate.

If it is necessary or desirable in any instance to undertake further purification of the sulphate, hydrochloride or picrate of the antibiotic produced by any of the extraction methods above described, this may be effected by conversion of the antibiotic to its helianthate. This may be done by dissolving the salt in aqueous methanol and adding a saturated solution of methyl orange. The helianthate separates after standing at 4° C. for 12 hours.

If the quantity of methyl orange added is such that about 80% of the antibiotic activity is associated with the precipitate, the latter contains the antibiotic in purified form, certain of the impurities remaining in the mother liquor in these circumstances. The precipitate may be washed successively with water and methanol and then treated with acid in methanol to convert the antibiotic to its soluble hydrochloride or other desired acid salt, which salt may be recovered in solid form, for example by precipitation with acetone.

Alternatively the crude sulphate of the antibiotic may be converted to the hydrochloride by treatment of the former with calcium chloride, filtering off the calcium sulphate which deposits along with certain impurities.

The new antibiotic is a fairly strong base. Its hydrochloride is extremely soluble in water and less easy to handle than its less soluble sulphate. Its helianthate is still less soluble. The base is an off-white amorphous solid. It is stable for short periods in aqueous solution at a pH of 3 to 8. It is very unstable in alkaline solutions. It cannot be extracted from aqueous solution by chloroform. It is most conveniently dissolved in water or methanol. The new antibiotic is a polypeptide yielding on complete acid hydrolysis, d-leucine, epsilon methyl octanoic acid, 1-threonine as the sole hydroxy amino acid, and in excess of 40 per cent alpha-gamma-diaminobutyric acid as the sole basic amino acid constituent calculated as $$\frac{\text{g. amino acid} \times 100}{\text{g. polymyxin base}}$$

further characterized by the absence of dicarboxylic amino acids from the hydrolysate. Certain batches yield, in addition, phenylalanine.

The antibiotic has been proved by in vivo experiments to have chemotherapeutic activity and give a useful degree of protection against the following pathogenic organisms: *Haemophilus pertussis, Haemophilus influenzae, Eberthella typhi, Escherichia coli* (including the haemolytic varieties thereof associated with the disease of white scour in calves) and *Brucella bronchiseptica*. It has been found to have in vitro anti-bacterial activity against all the organisms mentioned above and also against all species of Salmonella, *Pseudomonas aeruginosa, Shigella dysenteriae, Shigella paradysenteriae* and *Shigella sonnei*. It is also active against *K. pnumoniae, Sal. schottmülleri, B. abortus, Aerobacter aerogenes, Past. muriseptica, Past. multocida, Sal. enteritidis, Sal. paratyphi, Sal. pullorum, Sh. flexner, Sh. schmitz, Sh. shiga, Sh. gallinarum,* and *Pyocyaneus sepsis.*

It appears to be bactericidal and not merely bacteriostatic towards organisms sensitive to its activity.

What we claim is:

A basic polypeptide antibiotic extracted from a culture selected from the class consisting of *Bacillus aerosporus* Greer and *Bacillus polymyxa* (Prazmowski) Migula, containing the elements carbon, hydrogen, oxygen and nitrogen, the polypeptide being soluble in water, acid, lower alcohols and acid acetone but insoluble in alkali, adsorbed from alkaline aqueous solution by activated charcoal, yielding on complete acid hydrolysis, d-leucine, epsilon methyl octanoic acid, 1-threonine as the sole hydroxy amino acid, and in excess of 40 per cent alpha-gamma-diaminobutyric acid as the sole basic amino acid constituent calculated as $$\frac{\text{g. amino acid} \times 100}{\text{g. polymyxin base}}$$

further characterized by the absence of dicarboxylic amino acids from the hydrolysate, said antibiotic being essentially inactive against Gram-positive organisms and having specific activity against the Gram-negative organisms *Hemophilus pertussis, Hemophilus influenzae, Eberthella typhi, Escherichia coli, Brucella bronchiseptica, Pseudomonas aeruginosa, K. pnumoniae, Sal. schottmülleri, B. abortus, Aerobacter aerogenes, Sh. paradysenteriae, Past. muriseptica, Past. multocida, Sal. enteritidis, Sal. paratyphi, Sal. pullorum, Sh. flexner, Sh. schmitz, Sh. shiga, Sh. gallinarum, Sh. sonnei* and *Pyocyaneus sepsis.*

GEOFFREY CLOUGH AINSWORTH.
CLIFFORD GEORGE POPE.

REFERENCES CITED

The following references are of record in the file of this patent:

FOREIGN PATENTS

| Number | Country | Date |
|---|---|---|
| 315,263 | Great Britain | 1930 |

OTHER REFERENCES

Bergey's Manual of Determinative Bacteriology (5th ed.), Williams & Wilkins Co., Baltimore, 1939; pp. 701-704. (Copy in Sci. Lib.)

Waksman: J. Bact., vol. 46, pp. 299-310 (1943). (Copy in Sci. Lib.)

Waksman et al.: J. Bact., vol. 45, pp. 233-248 (1943). (Copy in Sci. Lib.)

J. Am. Pharm. Assoc. (Sci. Ed.), vol. 34, pp. 274-279 (1945). (Copy in Sci. Lib.)

Foster et al.: J. Bact., March 1946, pp. 363-369. (Copy in Sci. Lib.)

"New Antibiotic is Potent," Sci. News Letter, March 20, 1948, page 179. (Copies in Sci. Lib.)

Schatz et al.: Proc. Soc. Exp'tl. Biol. Med., vol. 62, pp. 143-145 (June 1946). (Copy in Sci. Lib.)

Gause: Science, vol. 104, pp. 289-290 (September 1946). (Copy in Sci. Lib.)

Tilden et al.: J. Bact., vol. 43, p. 533 (1942). (Copy in Sci. Lib.)

Stansley et al.: J. Bact. 54, pp. 549-556 (rec'd. for pub. July 23, 1947). (Copy in Sci. Lib.)

Tilden et al.: *B. Macerans* and *B. Polymyxa* Amylases, Jr. Bact. 43 (1942), pp. 527-544, only page 533 relied upon.

Porter: Bacterial Chemistry and Physiology, Wiley (1946), pp. 619, 626.

Stansby and Schlosser, "Studies on Polymyxin," Jr. Bact. 54, No. 5, pp. 549 to 556, November 1947.